United States Patent
Mauro, Sr. et al.

(10) Patent No.: US 7,153,418 B2
(45) Date of Patent: Dec. 26, 2006

(54) ARTIFICIAL POND

(75) Inventors: Joseph K. Mauro, Sr., Erlanger, KY (US); Philip A. Mayleben, Edgewood, KY (US)

(73) Assignee: Campbell Hausfeld/Scott Fetzer Company, Harrison, OH (US)

(*) Notice: Subject to any disclaimer, the term of this patent is extended or adjusted under 35 U.S.C. 154(b) by 636 days.

(21) Appl. No.: 10/393,160

(22) Filed: Mar. 20, 2003

(65) Prior Publication Data

US 2004/0182765 A1    Sep. 23, 2004

(51) Int. Cl.
    *B01D 29/00*    (2006.01)
(52) U.S. Cl. .................. 210/167; 210/170; 210/416.1; 210/424; 239/20
(58) Field of Classification Search .......... 210/167, 210/170, 416.1, 418, 420, 424, 747; 239/17, 239/18, 20, 23
    See application file for complete search history.

(56) References Cited

U.S. PATENT DOCUMENTS

| | | | | |
|---|---|---|---|---|
| 1,954,704 A | * | 4/1934 | Kraus | 239/23 |
| 4,056,470 A | * | 11/1977 | Carpenter | 210/94 |
| 4,437,811 A | * | 3/1984 | Iwata et al. | 417/8 |
| 4,806,392 A | * | 2/1989 | Dixon | 428/18 |
| 4,838,797 A | * | 6/1989 | Dodier | 439/38 |
| 5,092,312 A | * | 3/1992 | Zolow | 126/500 |
| 5,152,210 A | * | 10/1992 | Chen | 84/464 R |
| 5,317,776 A | * | 6/1994 | DeMoura | 15/1.7 |
| 5,708,337 A | * | 1/1998 | Breit et al. | 318/439 |
| 5,895,986 A | * | 4/1999 | Walters et al. | 307/117 |
| 6,021,033 A | * | 2/2000 | Benham et al. | 361/42 |
| 6,041,738 A | * | 3/2000 | Hemauer et al. | 119/226 |
| 6,206,298 B1 | * | 3/2001 | Ting | 239/20 |
| 6,406,621 B1 | * | 6/2002 | Bates et al. | 210/170 |
| 6,423,218 B1 | * | 7/2002 | Lindermeir et al. | 210/170 |
| 6,717,383 B1 | * | 4/2004 | Brunt et al. | 318/723 |
| 2003/0015477 A1 | * | 1/2003 | Hornsby, II | 210/739 |
| 2003/0196941 A1 | * | 10/2003 | Danner | 210/169 |
| 2004/0069860 A1 | * | 4/2004 | Nary | 239/17 |

* cited by examiner

*Primary Examiner*—Fred G. Prince
(74) *Attorney, Agent, or Firm*—Jones Day

(57) ABSTRACT

An artificial pond having a motor pump unit with a brushless permanent magnet synchronous alternating current motor that is wound for operation on an alternating current voltage not greater than fifteen volts, and a step down transformer that converts 120 volts AC to an AC voltage not greater than 15 volts.

31 Claims, 3 Drawing Sheets

US 7,153,418 B2

ARTIFICIAL POND

TECHNICAL FIELD

This application relates to the art of artificial ponds that have a motor pump unit for circulating water through a filter and/or a fountain spray.

BACKGROUND OF THE INVENTION

Artificial ponds typically use motor pump units and lamps that operate on either 120 volts AC or on DC voltage. The use of 120 volts AC requires installation by a licensed electrician and buried wires must be protected by conduit. DC motors are more expensive and less efficient than AC motors, and require more maintenance because of such requirements as motor brushes.

SUMMARY OF THE INVENTION

A kit for constructing an artificial pond includes an alternating current step down transformer that converts 120 volts AC to a low level AC voltage of less than 15 volts. A motor pump unit having a brushless permanent magnet synchronous motor is wound for operation on the transformer output that is not greater than 15 volts AC.

The low voltage eliminates shock hazards and simplifies the electrical installation. Low voltage wires can be buried underground without protective conduit and a licensed electrician is not required to run power to the pond site.

It is a principal object of the invention to provide an improved low voltage AC motor pump unit and a step down transformer that converts 120 volts AC to a low level AC voltage not greater than 15 volts for use with artificial ponds.

It is an other object of the invention to provide an improved artificial pond kit having the low voltage AC motor and step down transformer incorporated therein.

It is a further object of the invention to provide an artificial pond having components that can be installed by a homeowner without requiring the services of a contractor.

It is also an object of the invention to provide an artificial pond that has significantly reduced shock hazards.

DESCRIPTION OF A PREFERRED EMBODIMENT

Figure 1:
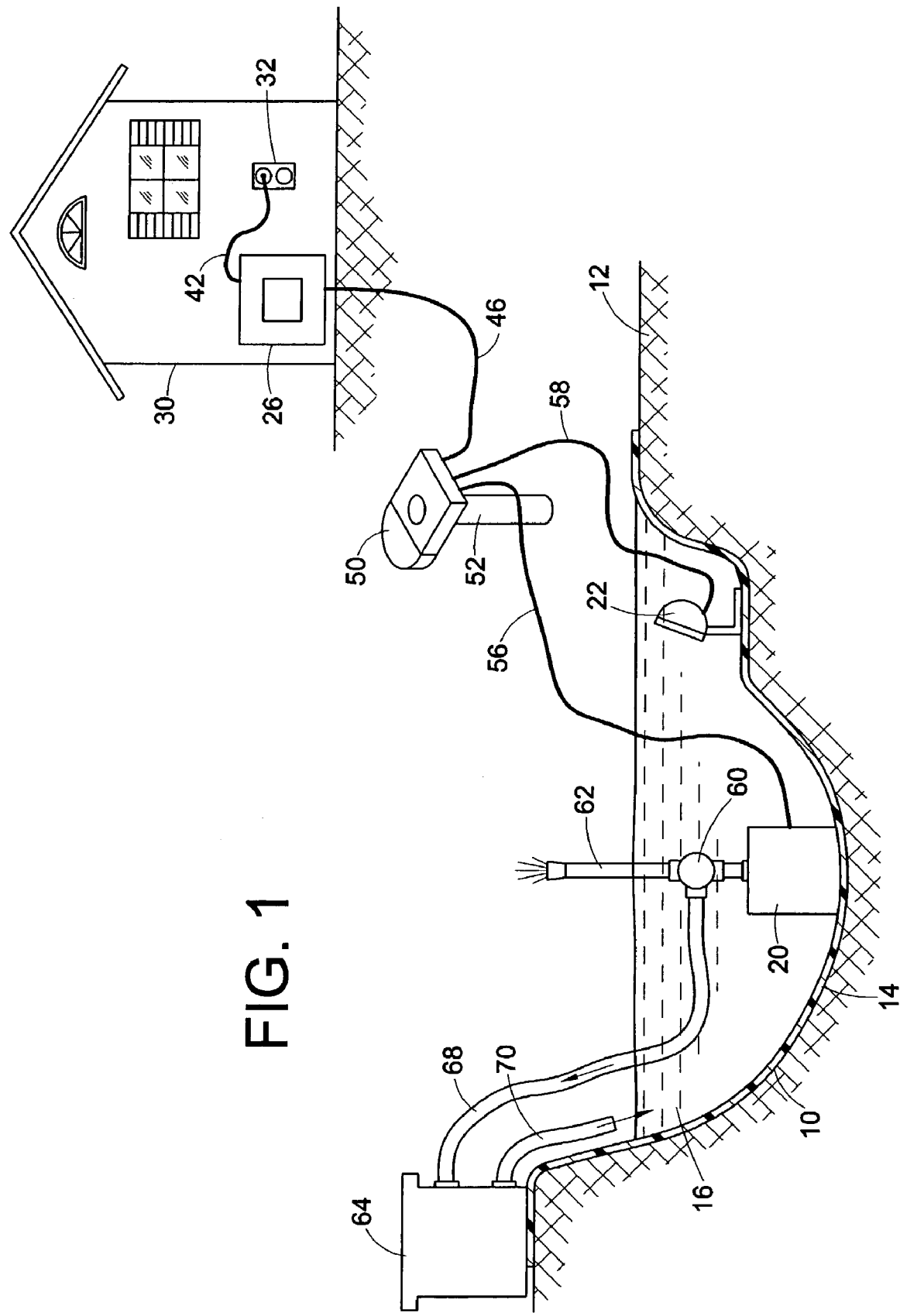
FIG. 1 is a pictorial illustration of an artificial pond having the improvements of the present application incorporated therein.

Referring now to the drawing, wherein the showings are for purposes of illustrating a preferred embodiment of the invention only and not for purposes of limiting same, FIG. 1 shows the components of an artificial pond. A depression 10 in the earth 12 is lined with an impervious liner 14 for holding water 16.

A submersible motor pump unit 20 and a submersible lamp 22 are positioned on liner 14 beneath the surface of water 16. A step down transformer 26 is attached to the outside surface of a wall on a building 30 that has a conventional 120 volt AC outlet 32. Transformer 26 has a plug and wire 42 that connects transformer 26 with the 120 volt AC power supply at electrical outlet 32.

Step down transformer 26 converts 120 volts AC to a low level AC voltage that is not greater than 15 volts AC and preferably about 12 volts AC. A low voltage output power wire 46 attached to transformer 26 and forming an integral part thereof is at least forty feet long, and more preferably at least fifty feet long. Wire 46 preferably is approved for direct burial underground service, such as by Underwriters Laboratories. Wire 46 is buried in the earth and connects step down transformer 26 with an automatic control device 50 having a support stake or post 52 that is driven into the earth or mounted in a post hole.

Control device 50 may take many forms, and preferably includes an optoelectronic device such as a photocell or phototransistor for turning a lamp on at dusk and off at dawn. However, it will be recognized that a timer or other programmable device may be provided for turning the lamp on and off at selected times and for selected periods. A wire 56 connects control device 50 with motor pump unit 20, and a wire 58 connects control device 50 with lamp assembly 22. In one arrangement, only lamp 22 is connected for on and off operation by automatic control device 50, and motor pump unit 20 is connected directly with transformer 26 through terminals on control device 50. A manual switch, a selectively programmable timer or another programmable device may be provided on control device 50 for controlling motor pump unit 20.

A diverter valve 60 attached to the outlet of motor pump unit 20 supplies water to a fountain spray 62 and a filter assembly 64. Water is supplied from diverter valve 60 to filter assembly 64 through a supply hose 68, and filter assembly 64 has a return hose 70 that is positioned for discharging filtered water back into the artificial pond.

Figure 2:
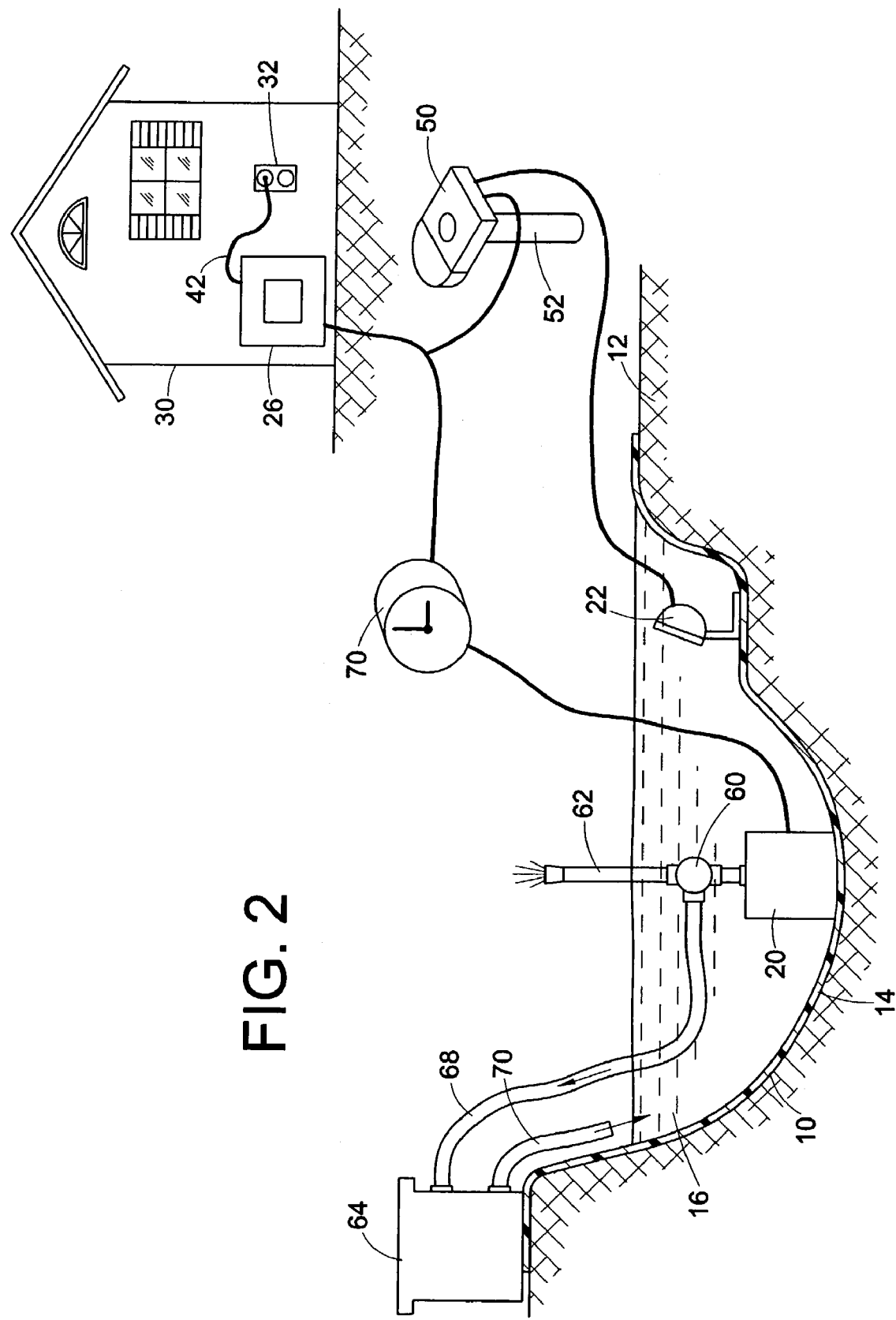
FIG. 2 is a view similar to FIG. 1 showing an alternative control arrangement.

In the alternative arrangement of FIG. 2, only lamp assembly 22 is connected with automatic control device 50 while motor pump unit 20 is connected with transformer 26 through a selectively settable timer 70. This enables a user to program the times for operation of motor pump unit 20. Obviously, timer 70 can be incorporated into automatic control device 50 so that the optoelectronic device for controlling the lamp and the programmable device for controlling the motor pump unit are combined into a single unit.

FIG. 3 shows diverter valve 60 having a housing 74 with an inlet 76 that attaches to the output of motor pump unit 20. Diverter valve housing 74 has a first outlet 78 that connects with hose 68 for supplying water to filter 64. A second outlet 80 is connected with fountain spray 62 for supplying water to the fountain spray 62. A rotatable internal shuttle 82 within housing 74 is movable to three different positions for controlling flow of water from the pump outlet.

Figure 3A:
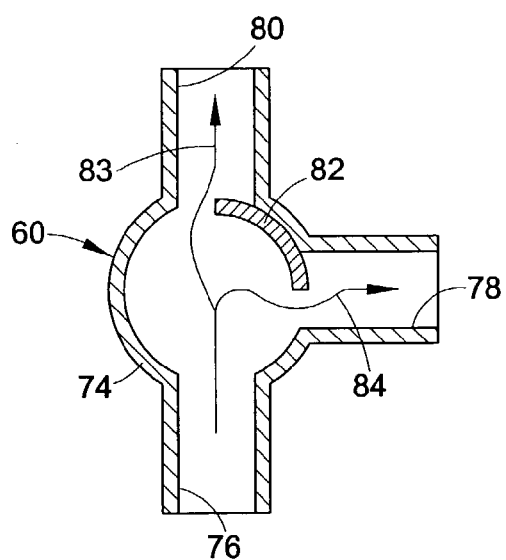
FIG. 3A is a plan view of the interior of a water flow control valve used with the artificial pond of FIGS. 1 and 2, with the top of the housing omitted for viewing the interior of the valve.

In the position of shuttle 82 in FIG. 3A, water flows from motor pump unit 20 through inlet 76 and out both of outlets 78 and 80 as indicated by arrows 83 and 84 to filter 64 and fountain spray 62.

Figure 3B:
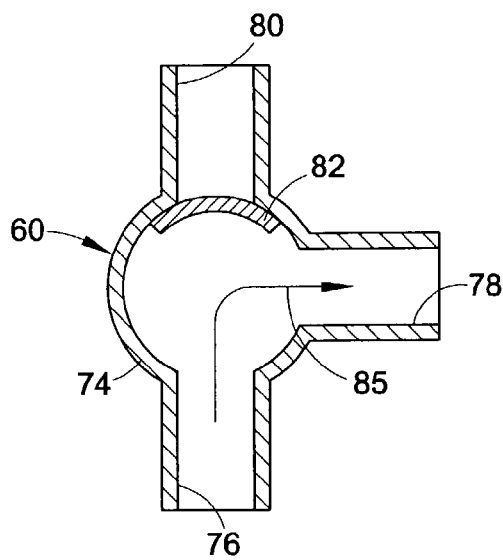
FIG. 3B is a view similar to FIG. 3 and showing the valve in an alternate position.

Shuttle 82 may be rotated to the position of FIG. 3B for closing outlet 80 while leaving outlet 78 fully open for water flow as indicated by arrow 85 so that water is supplied only to filter assembly 64 and not to fountain spray 62.

Figure 3C:
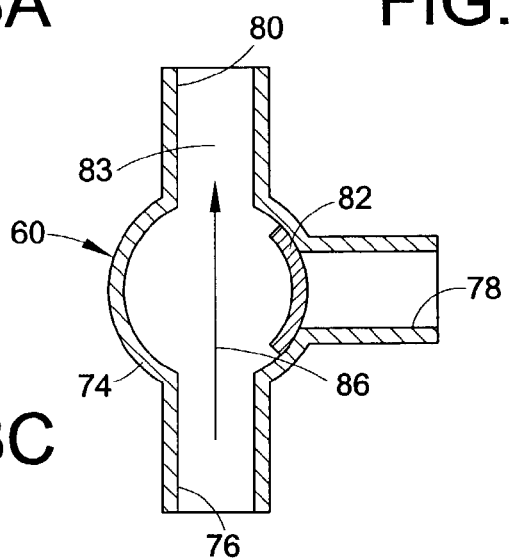
FIG. 3C is a view similar to FIG. 3A and showing the valve in yet another alternate position.

Valve shuttle 82 also may be rotated to the position shown in FIG. 3C closing outlet 78 while outlet 80 is fully open to water flow 86 so that water is supplied only to fountain spray 62 and not to filter assembly 64.

Figure 4:
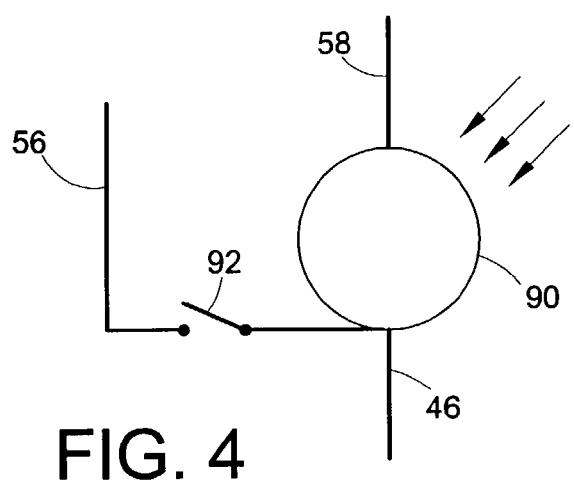
FIG. 4 is a simplified showing of an optoelectronic control arrangement used with the artificial pond of FIGS. 1 and 2.

FIG. 4 shows an optoelectronic device 90 that automatically turns lamp 22 on at dusk and off at daybreak. Optoelectronic device 90 may take many forms including, but not necessarily limited to, a photocell or phototransistor. A manually operable or programmable switch 92 on control device 50 is provided for selectively controlling operation of motor pump unit 20.

Motor pump unit 20 includes a conventional brushless permanent magnet synchronous AC motor that is provided with motor windings for operation of the motor on an AC voltage not greater than 15 volts, and preferably on an AC voltage of approximately 12 volts.

Although the invention has been shown and described with reference to representative embodiments, it is obvious that alterations and modifications will occur to others skilled in the art upon the reading and understanding of this application. Therefore, it is to be understood that the invention may be practiced otherwise than as specifically described herein while remaining within the scope of the claims.

We claim:

1. A kit for constructing an artificial pond comprising:
   an alternating current step down transformer that converts 120 volts AC to a low level AC voltage of less than 15 volts AC;
   a submersible alternating current motor pump unit operable at said low level AC voltage, said motor pump unit having a pump inlet and a pump outlet;
   a diverter valve having a valve inlet connectable with said pump outlet, said valve having first and second valve outlets;
   a filter having a filter inlet and a filter outlet;
   a hose that connects said first valve outlet with said filter inlet;
   a fountain assembly that connects with said second valve outlet;
   at least one submersible lamp operable at said low level AC voltage;
   an automatic control device operable at said low level AC voltage for controlling at least said lamp;
   wires for connecting said transformer with said automatic control device and for connecting said automatic control device with said light and with said motor pump unit; and
   an impervious liner for lining a depression in the earth, the liner then being fillable with water in which the lamp and motor pump unit are submerged.

2. The kit of claim 1 wherein said alternating current step down transformer converts 120 volts AC to a low level AC voltage of 12 volts AC.

3. The kit of claim 1 wherein said motor pump unit has a brushless permanent magnet synchronous motor.

4. The kit of claim 1 wherein said automatic control device includes a timer.

5. The kit of claim. 1 wherein said automatic control device includes an optoelectronic device that automatically operates to turn said lamp on when it is dark and off when it is light.

6. The kit of claim 1 wherein said transformer includes a low voltage output direct burial power wire that is at least forty feet long and is approved for underground service.

7. The kit of claim 6 wherein said burial wire is at least fifty feet long.

8. The kit of claim 1 wherein said automatic control device includes a pump control for controlling operation of said motor pump unit.

9. The kit of claim 8 wherein said pump control is a selectively operable switch.

10. The kit of claim 8 wherein said pump control is programmable.

11. An artificial pond comprising:
    a depression in the earth that is lined with an impervious liner;
    water at least partially filling the liner to form a pond;
    an alternating current step down transformer that converts 120 volts AC to a low level AC voltage of less than 15 volts AC, said transformer being remote from said pond;
    an alternating current motor pump unit operable at said low level AC voltage, said motor pump unit being submerged in said water and supported on said liner, said motor pump unit having a pump inlet and a pump outlet;
    a diverter valve having a valve inlet connectable with said pump outlet, said valve having first and second valve outlets;
    a filter supported adjacent to said pond and having a filter inlet and a filter outlet, said filter outlet being positioned to discharge water into said pond;
    a hose connecting said first valve outlet with said filter inlet;
    a fountain assembly connected with said second valve outlet and projecting above said pond;
    at least one lamp operable at said low level AC voltage, said lamp being submerged in said pond and supported on said liner;
    an automatic control device operable at said low level AC voltage, said automatic control device being positioned externally of said pond for controlling at least said lamp; and,
    wires connecting said transformer with said automatic control device and connecting said automatic control device with said lamp and with said motor pump unit.

12. The pond of claim 11 wherein said motor pump unit has a brushless permanent magnet synchronous motor.

13. The pond of claim 11 wherein said automatic control device includes a timer.

14. The pond of claim 11 wherein said automatic control device includes an optoelectronic device that automatically operates to turn said lamp on when it is dark and off when it is light.

15. The pond of claim 11 wherein said transformer includes a low voltage output direct burial wire that is at least forty feet long and is approved for underground service.

16. The pond of claim 15 wherein said burial wire is at last fifty feet long.

17. The pond of claim 11 wherein said automatic control device includes a pump control for controlling operation of said motor pump unit.

18. The pond of claim 17 wherein said pump control is a selectively operable switch.

19. The pond of claim 17 wherein said pump control is programmable.

20. A kit for constructing an artificial pond comprising:
    an alternating current step down transformer that converts 120 volts AC to a low level AC voltage of less than 15 volts AC;

a submersible alternating current motor pump unit operable at said low level AC voltage;
a fountain assembly through which water from the pump is dischargeable;
wire for connecting said transformer with said motor pump unit;
an impervious liner for lining a depression in the earth, the liner then being fillable with water in which the motor pump unit is submerged; and
a diverter valve connectable between said motor pump unit and said fountain assembly, said diverter valve having one position for supplying water therethrough to the fountain assembly and another position for diverting at least some water away from the fountain assembly.

21. The kit of claim 20 including a filter associated with the motor pump unit.

22. The kit of claim 21 wherein said filter is on the discharge side of said motor pump unit.

23. The kit of claim 21 wherein said filter is connectable with said diverter valve for circulation of water through said filter when said diverter valve is in said other position.

24. An artificial pond comprising:
a depression in the earth that is lined with an impervious liner;
water at least partially filling the liner to form a pond;
an alternating current step down transformer that converts 120 volts AC to a low level AC voltage of less than 15 volts AC, said transformer being remote from said pond;
an alternating current motor pump unit operable at said low level AC voltage, said motor pump unit being submerged in said water and supported on said liner;
a fountain assembly projecting above said pond and connected for discharging water from said motor pump unit;
wire connecting said transformer with said motor pump unit; and
a diverter valve connected between said motor pump unit and said fountain assembly, said diverter valve having one position for supplying water therethrough to the fountain assembly and another position for diverting at least some water away from the fountain assembly.

25. The pond of claim 24 including a filter associated with the motor pump unit.

26. The pond of claim 24 wherein said filter is on the discharge side of said motor pump unit.

27. The pond of claim 24 wherein said filter is connected with said diverter valve for circulation of water through said filter when said diverter valve is in said other position.

28. A kit for constructing an artificial pond comprising:
an alternating current step down transformer that converts 120 volts AC to a low level AC voltage of less than 15 volts AC;
a submersible alternating current motor pump unit operable at said low level AC voltage, the motor pump unit being submersible in a pond of water;
a fountain assembly through which water from the pump is dischargeable;
wire for connecting said transformer with said motor pump unit; and
a diverter valve connectable between said motor pump unit and said fountain assembly, said diverter valve having one position for supplying water therethrough to the fountain assembly and another position for diverting at least some water away from the fountain assembly.

29. The kit of claim 28 including a filter associated with the motor pump unit.

30. The kit of claim 29 wherein said filter is on the discharge side of said motor pump unit.

31. The kit of claim 29 wherein said filter is connectable with said diverter valve for circulation of water through said filter when said diverter valve is in said other position.

* * * * *